(12) United States Patent
Kim et al.

(10) Patent No.: US 8,866,538 B2
(45) Date of Patent: Oct. 21, 2014

(54) CONSTANT CURRENT CIRCUIT OF HIGH EFFICIENCY

(75) Inventors: Hyun-Tak Kim, Daejeon (KR); Bongjun Kim, Daejeon (KR); Sun Shin Kwag, Goyang-si (KR); Jun Sik Kim, Anyang-si (KR)

(73) Assignees: Electronics and Telecommunications Research Institute, Daejeon (KR); Dongwon Systems Corporation, Anyang-Si (KR)

( * ) Notice: Subject to any disclaimer, the term of this patent is extended or adjusted under 35 U.S.C. 154(b) by 0 days.

(21) Appl. No.: 13/824,993

(22) PCT Filed: Jan. 12, 2012

(86) PCT No.: PCT/KR2012/000310
§ 371 (c)(1),
(2), (4) Date: Mar. 18, 2013

(87) PCT Pub. No.: WO2012/096534
PCT Pub. Date: Jul. 19, 2012

(65) Prior Publication Data
US 2013/0278327 A1    Oct. 24, 2013

(30) Foreign Application Priority Data

Jan. 13, 2011  (KR) .................. 10-2011-0003519
Nov. 9, 2011   (KR) .................. 10-2011-0116466

(51) Int. Cl.
*G05F 1/10*     (2006.01)
*G05F 3/02*     (2006.01)

(52) U.S. Cl.
CPC ........................................ *G05F 3/02* (2013.01)
USPC ............................ 327/538; 327/513; 327/542

(58) Field of Classification Search
USPC ......... 327/512, 513, 530, 534, 535, 538, 540, 327/542
See application file for complete search history.

(56) References Cited

U.S. PATENT DOCUMENTS

| 5,973,543 | A | 10/1999 | Shimura | |
| 7,279,954 | B2 * | 10/2007 | Throngnumchai et al. ... | 327/512 |
| 2011/0018607 | A1 | 1/2011 | Kim et al. | |
| 2011/0043141 | A1 * | 2/2011 | Kim et al. ............... | 315/309 |
| 2012/0286753 | A1 * | 11/2012 | Zhong et al. ............. | 323/282 |

FOREIGN PATENT DOCUMENTS

| KR | 20-1990-0007600 a | 5/1994 |
| KR | 10-1997-049213 A | 7/1997 |
| KR | 10-1998-0012844 A | 4/1998 |
| KR | 10-2009-0049010 A | 5/2009 |
| KR | 10-2009-0091648 A | 8/2009 |

OTHER PUBLICATIONS

International Search Report for PCT/KR2012/000310 filed on Jan. 12, 2012.

* cited by examiner

*Primary Examiner* — Jeffrey Zweizig

(57) ABSTRACT

The present inventive concept is a hyuntak transistor that can prevent a thermal runaway phenomenon and a low heat high efficiency constant current circuit using an auxiliary transistor capable of a high amplification and a constant current. The circuit may be applied to drive a LED and a motor.

24 Claims, 5 Drawing Sheets

Fig. 1
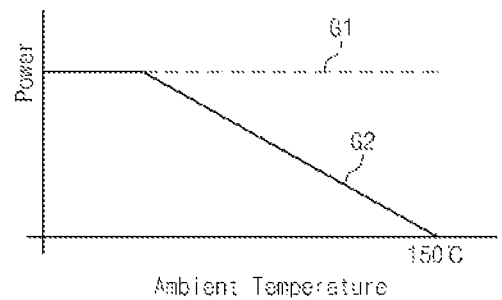
Fig. 2 <PRIOR ART>
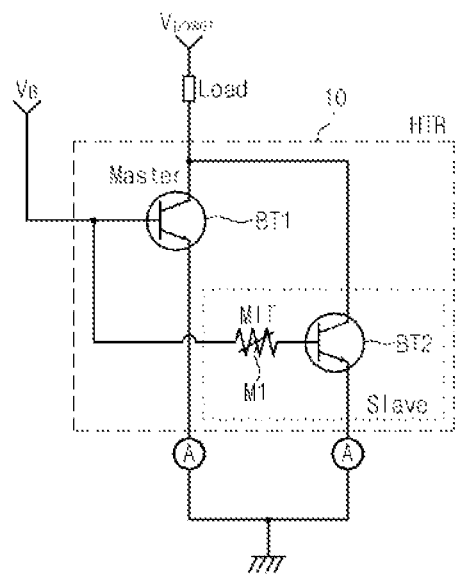
Fig. 3
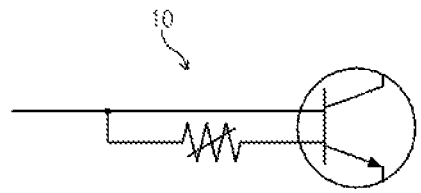

Fig. 11

| $V_{IN}$ | LED $V_F$ | Total $V_F$ | Constant Current Consuming Voltage | Total $V_F$ | When $V_F$ Varies(2.4V up): $V_{IN}$ = 17.8V~20.2V $I_F$ = 550mA Total 11.11Watt | | | |
|---|---|---|---|---|---|---|---|---|
| | | | | | Constant Current Consuming Voltage | Driver Efficiency | Heating (degree) | Note |
| 20.5V | 2.8V | 16.8V | 3.7V | 570mA | 2.11W | 82.0% | 67 | $I_F$ Measurement Deviation:9mA |
| | 2.9V | 17.4V | 3.1V | 568mA | 1.76W | 84.9% | 57 | |
| | 3.0V | 18.0V | 2.5V | 565mA | 1.41W | 87.8% | 49 | |
| | 3.1V | 18.6V | 1.9V | 565mA | 1.07W | 90.7% | 42 | |
| | 3.2V | 19.2V | 1.3V | 561mA | 0.73W | 93.6% | 35 | |

CONSTANT CURRENT CIRCUIT OF HIGH EFFICIENCY

TECHNICAL FIELD

The present inventive concept herein relates to circuits of electronic device, and more particularly, to a constant current circuit of high efficiency.

BACKGROUND ART

In general, when a current flows through a bipolar transistor, Joule's heat is produced and an electrical resistance of semiconductor device is reduced by the produced Joule's heat. Accordingly, larger currents flow through a bipolar transistor and more Joule's heat are produced. If this process is repeated, very large currents flow through a bipolar transistor and a power characteristic of bipolar transistor is degraded by the produced Joule's heat.

A bipolar transistor may be destroyed by more Joule's heat and this phenomenon is called a thermal runaway. A solution to prevent that thermal runaway is that a constant current flows through a bipolar transistor or a semiconductor transistor.

A well known constant current circuit essentially includes a comparator comparing a feedback current with a reference current in a load terminal. Since this constant current circuit should include a comparator, the constant current circuit has a complicated structure and is expensive. If large currents flow through the constant current circuit like that, a thermal runaway occurs in a semiconductor device itself. Thus, that constant current circuit is not suitable as a constant current circuit through which relatively large currents flow.

A constant current circuit in which a thermal runaway relatively does not occur and through which relatively large currents can flow is disclosed in K.R Patent No. 10-0964186-00-00, titled "heat control circuit of transistor using a metal-insulator transition (MIT) device and a heat control method" invented by multiple inventors besides Hyuntak kim.

As disclosed in claim 18 of the patent, a constant current circuit through which larger currents can flow may be developed using the MIT device and two electric power transistors.

However, when designing a constant current circuit using a bipolar transistor, a current may be inefficiently wasted. Thus, in a constant current circuit using a bipolar transistor, measures to increase an efficiency of transistor are required.

DISCLOSURE OF INVENTION

Embodiments of the inventive concept provide a constant current circuit. The constant current circuit may include a power supply voltage source; a load of which one end is connected to the power supply voltage source; a heat control portion connected between the other end of the load and a ground connection resistor to suppress a thermal runaway phenomenon of semiconductor; a first transistor connected to the other end of the load in parallel to the heat control portion to increase current efficiency of the heat control portion; and a second transistor switched depending on a node voltage of the ground connection resistor to maintain the flow of constant current to the ground connection resistor, the second transistor being connected between the ground connection resistor and the first transistor.

Embodiments of the inventive concept also provide a constant current circuit. The constant current circuit may include a power supply voltage source; a load of which one end is connected to the power supply voltage source; a bipolar power transistor connected between the other end of the load and a ground connection resistor; a first transistor connected to the other end of the load in parallel to the bipolar power transistor to increase current efficiency of the bipolar power transistor; and a second transistor switched depending on a node voltage of the ground connection resistor to maintain the flow of constant current to the ground connection resistor, the second transistor being connected between the ground connection resistor and the first transistor.

Embodiments of the inventive concept also provide a constant current circuit. The constant current circuit may include a power supply voltage source; a load of which one end is connected to the power supply voltage source; a PNP-type heat control transistor of HTR transistor type of which an emitter is connected to the other end of the load and a collector is connected to a ground connection resistor to suppress a thermal runaway phenomenon of semiconductor; a first transistor connected to the other end of the load in parallel to the heat control transistor to increase operation efficiency of the heat control transistor; and a second transistor switched depending on a node voltage of the ground connection resistor to maintain the flow of constant current to the ground connection resistor, the second transistor being connected between the ground connection resistor and the first transistor.

Embodiments of the inventive concept also provide a method of drive a constant current circuit. The method may include applying a power supply voltage source to one end of a load; applying a load voltage in common to a collector of a heat control transistor connected to the other end of the load and a collector of a first transistor connected to the other end of the load in parallel to the heat control transistor; applying a base voltage to a base of the first transistor so that an emitter voltage of the first transistor is applied to a base of the heat control transistor; and making a base current of the heat control transistor flow into a ground using a second transistor whenever a node voltage between an emitter of the heat control transistor and a ground connection resistor is greater than a predetermined voltage.

EFFECT OF INVENTION

Since the constant current circuit of the inventive concept is strong against a thermal runaway phenomenon, relatively large constant currents can be flow through the constant current circuit. Also, since a base current of bipolar transistor is minimized or reduced, power consumption of the constant current circuit is minimized or reduced. Accordingly, a constant current circuit of high efficiency may be provided.

BRIEF DESCRIPTION OF DRAWINGS

Preferred embodiments of the inventive concept will be described below in more detail with reference to the accompanying drawings. The embodiments of the inventive concept may, however, be embodied in different forms and should not be constructed as limited to the embodiments set forth herein. Rather, these embodiments are provided so that this disclosure will be thorough and complete, and will fully convey the scope of the inventive concept to those skilled in the art. Like numbers refer to like elements throughout.

FIG. 1 is a graph showing a characteristic of a power relative to a temperature of a transistor.

FIG. 2 is a circuit of Hyuntak Transistor (HTR) having MIT (metal-insulator transition).

FIG. 3 is a symbol indicating the HTR of FIG. 2.

FIG. 11 is a table illustrating power consumption and a drive efficiency measured by the circuit of FIG. 10.

BEST MODE FOR CARRYING OUT THE INVENTION

Figure 4:
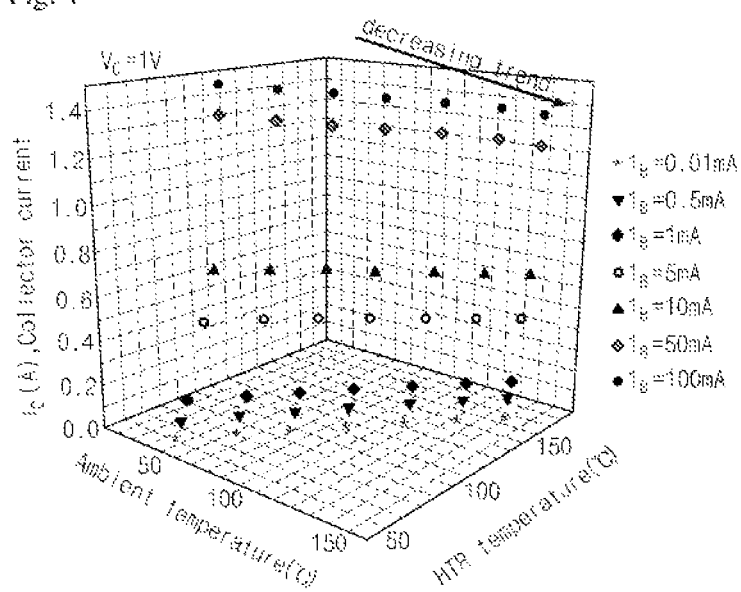
FIG. 4 is a graph showing dependence on an external environment among characteristics of the HTR of FIG. 2.

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present.

FIG. 1 is a graph showing a characteristic of a power relative to a temperature of a transistor. In the graph, a horizontal axis represents a temperature and a vertical axis represents a power.

A graph G2 represents a characteristic of power relative to a temperature of conventional transistor. The graph G2 shows that if a temperature of transistor becomes high, a characteristic of power is rapidly deteriorated. Thus, as a temperature is high, large currents flow and thereby probability that a thermal runaway occurs is increased. A desirable characteristic of power relative to a temperature of transistor is that a power is constant regardless of a temperature as a graph G1 represented by a dash line. A constant current circuit having a characteristic like the graph G1 is required in a lightning control field or a motor control field.

As a prior art that larger currents can flow by reducing a thermal runaway phenomenon, there is a K.R Patent No. 10-0964186-00-00, titled "heat control circuit of transistor using a metal-insulator transition (MIT) device and a heat control method". In that patent, a circuit of FIG. 2 is disclosed as a part of the description.

Referring to FIG. 2, a circuit including two bipolar transistors BT1 and BT2 and a metal-insulator transition (MIT) device M1 is illustrated. The MIT device M1 is connected between a base of the master bipolar transistor BT1 and a base of the slave bipolar transistor BT2. The MIT device M1 has a characteristic such that it transits to a metal when temperatures of the bipolar transistors BT1 and BT2 increase to a critical temperature. Accordingly, since a current flow is reduced or cut off, heat is stopped or reduced and thereby the bipolar transistors BT1 and BT2 are cooled. If the bipolar transistors BT1 and BT2 are cooled below a specific temperature, the MIT device M1 transits to an insulator again and thereby a normal power is obtained by the bipolar transistors BT1 and BT2.

In some embodiments of the inventive concept, the circuit of FIG. 2 is named a Hyuntak Transistor (HTR) after the inventor's name. The Hyuntak Transistor (HTR) is represented by a symbol illustrated in FIG. 3.

FIG. 3 is a symbol indicating the HTR of FIG. 2. The symbol is a thing briefly indicating the circuit of FIG. 2.

FIG. 4 is a graph showing dependence on an external environment among characteristics of the HTR of FIG. 2. A horizontal axis and a vertical axis represent an ambient temperature and a temperature of the HTR transistor respectively. A longitudinal axis represents a collect current. The graph of FIG. 4 shows that if a collector current increases, a heat temperature of the HTR becomes high and a heat characteristic also dependents on an ambient temperature.

Figure 5:
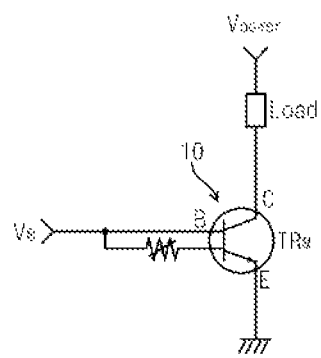
FIG. 5 is a circuit illustrating a case of when the load is taken to the HTR of FIG. 2.

FIG. 5 is a circuit illustrating a case of when the load is taken to the HTR of FIG. 2. Herein, the load is connected between one end of power supply voltage source Vpower and a collector of the HTR transistor. In a simple circuit like FIG. 5, a base current is great and thereby an efficiency of circuit is low.

If currents flowing an emitter, a base and a collector of the HTR transistor are called $I_E$, $I_B$ and $I_C$ respectively, $I_E=I_B+I_C$.

In case of $I_C=hI_B$, h represents a gain. Thus, it becomes that $I_E=(1+h)I_B \approx hI_B$. For example, in case of h=100, $I_C$=1 A, it becomes that $I_B$=1 A/100=0.01 A.

A circuit having a better efficiency may be provided by reducing a base current.

Figure 6:
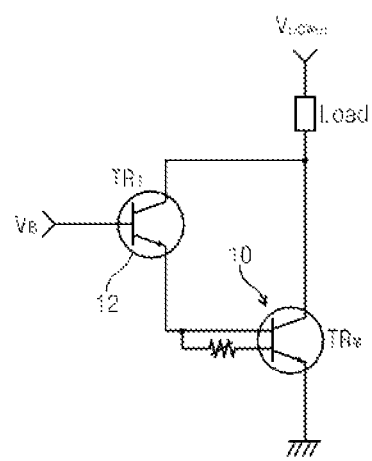
FIG. 6 is a circuit such that a first transistor for amplification is additionally connected to the circuit of FIG. 5.

To reduce a base current, a circuit like FIG. 6 is suggested. FIG. 6 is a circuit such that a first transistor 12 for amplification is additionally connected to the circuit of FIG. 5.

In the circuit like FIG. 6 having a Darlington transistor structure, a base current may be reduced to ¹/₁₀₀th. If assume that a gain h of the first transistor 12 and the HTR transistor 10 is 100 and a collector current of the HTR transistor 10 is 1 A, a base current ($I_{HTR\_B}$) of the HTR transistor 10 becomes 1 A/h=0.01 A. Since $I_{TR1\_E}=I_{HTR\_B}$, it becomes that $I_{TR1\_B}=I_{TR1\_E}/h=I_{HTR\_B}/100=0.0001$ A. Thus, an efficiency of base current is improved by adopting the first transistor 12 and the circuit may be precisely controlled.

Figure 7:
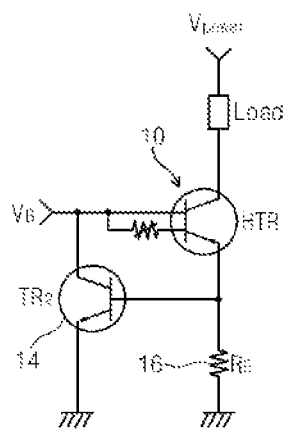
FIG. 7 is a circuit such that a second transistor for constant current drive is additionally connected to the circuit of FIG. 5.

FIG. 7 is a circuit such that a second transistor 14 for constant current drive is additionally connected to the circuit of FIG. 5. In FIG. 7, a resistor RE 16 added together with the second transistor 14 is an emitter resistor 16 connected to an emitter of the HTR transistor 10.

In FIG. 7, if an emitter voltage $V_E$ of the HTR transistor 10 is higher than 0.7V, the second transistor 14 is driven. Accordingly, since a base current of the HTR transistor 10 flows to a ground through the second transistor 14, a base current of the HTR transistor is reduced. If a base current of the HTR transistor is reduced, an emitter voltage of the HTR transistor becomes lower than 0.7V and thereby the second transistor 14 is not driven. If the second transistor 14 is not driven, an emitter voltage $V_E$ of the HTR transistor 10 becomes higher than 0.7V again. As a turn-on/turn-off operations or a current control operation of the second transistor 14 is repeated, a constant current flows through the emitter of the HTR transistor while an emitter voltage $V_E$ of the HTR transistor 10 is maintained at 0.7V.

Figure 8:
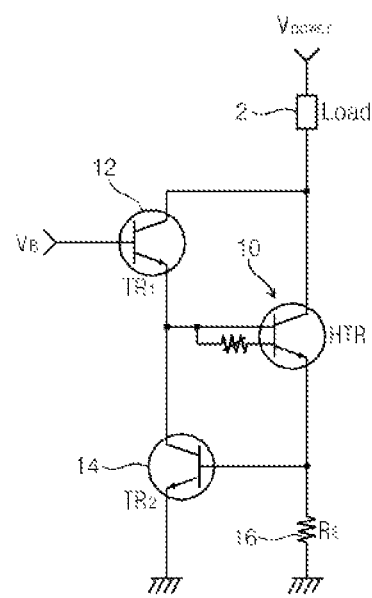
FIG. 8 is a constant current circuit in accordance with some embodiments of the inventive concept.

FIG. 8 is a constant current circuit in accordance with some embodiments of the inventive concept.

Referring to FIG. 8, the constant current circuit includes a power supply voltage source Vpower, a load 2, a heat control portion 10 and first and second transistors 12 and 14.

One end of the load 2 is connected to the power supply voltage source Vpower.

The heat control portion 10 is connected between the other end of the load 2 and a ground connection resistor 16 to suppress a thermal runaway phenomenon of semiconductor. The resistor 16 is an emitter resistor RE.

The first transistor 12 is connected to the other end of the load 2 in parallel to the heat control portion 10 to increase a current efficiency of the heat control portion 10.

The second transistor 14 is connected between the ground connection resistor 16 and the first transistor 12. The second transistor 14 is switched depending on a node voltage $V_E$ of the ground connection resistor 16 to maintain a constant current flow.

The heat control portion 10 may be the HTR transistor including a t least two bipolar transistors and a metal-insulator transition device.

The HTR transistor 10, as illustrated in FIG. 2, may include a master bipolar transistor BT1 of which a collector is connected to the other end of the load 2 and an emitter is connected to the ground connection resistor, a slave bipolar transistor BT2 of which a collector is connected to a collector of the master bipolar transistor and an emitter is connected to the ground connection resistor and a metal-insulator transition device M1 of which resistance is changed depending on a temperature, the metal-insulator transition device M1 being connected between a base of the master bipolar transistor and a base of the slave bipolar transistor.

The first transistor 12 may be an NPN type bipolar transistor of which a collector is connected to the other end of the load 2 and an emitter is connected to a base of the master bipolar transistor BT1. The first transistor 12 receives a base voltage being applied through its base.

The second transistor 14 may be an NPN-type bipolar transistor of which a collector is connected to the emitter of the first transistor 12 and an emitter is connected to the ground. The second transistor 14 receives a node voltage $V_E$ of the ground connection resistor 16 through its base.

The load 2 may be a load requiring a constant current and may be one of LED, a power LED for lightning and a motor.

The constant current circuit of FIG. 8 may be packaged in one chip package. The constant current circuit except the metal-insulator transition device may be packaged in one chip package and the one chip package may include terminals to connect the metal-insulator transition device at outside of the package.

Because the constant current circuit like FIG. 8 has the advantages described in FIGS. 6 and 7, it is strong on a thermal runaway phenomenon.

Thus, a relatively great current can flow through the constant current circuit and a base current of bipolar transistor is minimized or reduced and thereby power consumption of the constant current circuit is minimized or reduced. Accordingly, a constant current of higher efficiency is provided.

Figure 9:
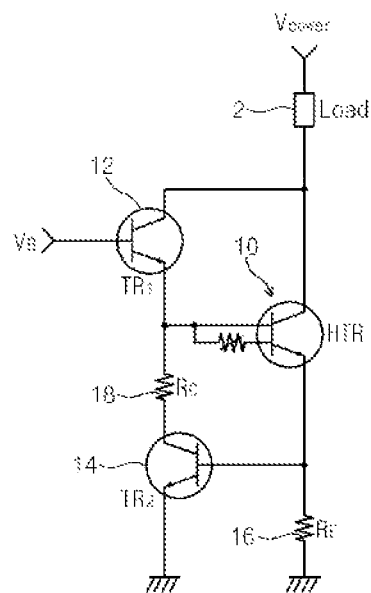
FIG. 9 is a circuit such that a collector resistance is additionally connected to the circuit of FIG. 8.

FIG. 9 is a circuit such that a collector resistance is additionally connected to the circuit of FIG. 8.

Referring to FIG. 9, a resistor Rc for current limit 18 is additionally connected between a base of the HTR transistor 10 and a collector of the second transistor 14. The circuit like FIG. 9 may also have the advantages which the circuit like FIG. 8 has.

In the constant current circuit of FIG. 8 or FIG. 9, a high efficiency constant current circuit may be provided even in the case of adopting a bipolar power transistor instead of the HTR transistor.

Figure 10:
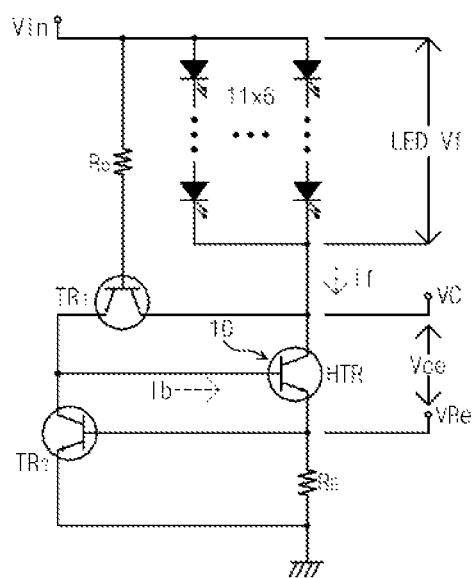
FIG. 10 is an application circuit such that a power LED is connected to the circuit of FIG. 8 as an example of load.

FIG. 10 is an application circuit such that a power LED is connected to the circuit of FIG. 8 as an example of load.

FIG. 11 is a table illustrating power consumption and a drive efficiency measured by the circuit of FIG. 10.

First, referring to FIG. 10, a constant current circuit may include a power supply voltage source Vin, a LED array in which a common node is connected to the power supply voltage source Vin and LED is arranged in a matrix shape of a row and column, a heat control portion 10 connected between a common cathode of the LED array and a ground connection resistor $R_E$ to suppress a thermal runaway phenomenon of semiconductor, a first transistor TR1 connected to the common cathode in parallel to the heat control portion to increase a current efficiency of the heat control portion 10, and a second transistor TR2 switched depending on a node voltage of the ground connection resistor to maintain the flow of constant current to the ground connection resistor, the second transistor TR2 being connected between the ground connection resistor and the first transistor.

The number of row and column of the LED array is 11 and 16. That is, the LED array is a load structure in which eleven LEDs are connected in parallel and six LEDs are connected in series.

The transistor used as the heat control portion 10 is the HTR transistor, the first bipolar transistor TR1 is SN222 and the second bipolar transistor TR2 is 2N3 904.

Also, a power of 82 Kw is consumed in $R_b$, a power of 1.3 W is consumed in $R_e$ and a rated $I_F=I_{CE}=550$ Ma. When a LED for lightning is produced, a LED applying voltage has a deviation of maximum 0.4V (e.g., 2.8V~3.2V). Thus, when six LEDs are connected in series, a LED applying voltage has a deviation of maximum 2.4V (i.e., 16.2V~19.2V). An input voltage of HTR is 20.5V including a HTR emitter resistor voltage. In this case, a voltage difference of maximum 3V is generated and thereby a great heat may occur in the HTR.

However, if using the constant current circuit like FIG. 8, a deviation of a collector-emitter current $I_F$ of the HTR transistor may be reduced to 9 mA and a heat of the device may be greatly reduced as illustrated in FIG. 11.

In general, in a constant current circuit, a deviation of 9 mA with respect to 550 mA is considered to be a good efficiency. This is because an allowable deviation in a well known constant current circuit is 40 mA or so. Referring to the table of FIG. 11, in the constant current circuit of FIG. 10, heat efficiency is about 82.0%~90.7%, power consumption of constant current is 1.07 W~2.11 W. The constant current circuit of FIG. 10 has a superior characteristic compared with a general constant current circuit.

Using the HTR transistor and auxiliary transistors, the high efficient constant current circuit like FIG. 10 may be simply designed without adopting a comparator.

According to some embodiments of the inventive concept, since the HTR transistor is used as a heat control portion, even if large currents flow, it is difficult for a thermal runaway to occur. Also, a base current is minimized by adopting the first bipolar transistor and thereby a power waste is greatly reduced. Thus, high efficiency of the HTR transistor is accomplished. An operation of the constant current circuit is smoothly performed by adopting the second bipolar transistor.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A constant current circuit comprising:
a power supply voltage source;
a load including one end coupled to the power supply voltage source;
a heat control portion coupled between the other end of the load and a first end of a ground connection resistor, the ground connection resistor having a second end coupled to a ground, the heat control portion configured to suppress a thermal runaway phenomenon of the constant current circuit;
a first transistor coupled to the other end of the load in parallel to the heat control portion and configured to increase current efficiency of the heat control portion; and
a second transistor configured to switch based on a node voltage at a node coupled to the first end of the ground connection resistor to maintain a level of a current flowing to the ground connection resistor substantially constant, the second transistor being coupled between the ground connection resistor and the first transistor.

2. The constant current circuit of claim 1, wherein the heat control portion is a HTR transistor including at least two bipolar transistors and a metal-insulator transition device.

3. The constant current circuit of claim 2, wherein:
one of the at least two bipolar transistors includes a master bipolar transistor having a collector coupled to the other end of the load and an emitter coupled to the first end of the ground connection resistor;
another of the at least two bipolar transistors includes a slave bipolar transistor having a collector coupled to the collector of the master bipolar transistor and an emitter coupled to the first end of the ground connection resistor; and
a metal-insulator transition device of which resistance is changed depending on a temperature, the metal-insulator transition device being coupled between a base of the master bipolar transistor and a base of the slave bipolar transistor.

4. The constant current circuit of claim 3, wherein the first transistor is an NPN-type bipolar transistor having a collector coupled to the other end of the load and an emitter coupled to the base of the master bipolar transistor, the first transistor configured to receive a base voltage through its base.

5. The constant current circuit of claim 4, wherein the second transistor is an NPN-type bipolar transistor having a collector coupled to the emitter of the first transistor and an emitter is connected to the ground, the second transistor configured to receive the node voltage through its base.

6. The constant current circuit of claim 5, wherein a resistor for current limit is additionally coupled between the base of the master bipolar transistor and the collector of the second transistor.

7. The constant current circuit of claim 1, wherein the load is a load requiring a constant current.

8. The constant current circuit of claim 7, wherein the load is at least one of a LED, a power LED for lightning and a motor.

9. The constant current circuit of claim 1, wherein the constant current circuit is packaged in one chip package.

10. The constant current circuit of claim 3, wherein the constant current circuit except the metal-insulator transition device is packaged in one chip package and the chip package includes terminals configured to couple the metal-insulator transition device to the chip package.

11. A constant current circuit comprising:
a power supply voltage source;
a load including one end coupled to the power supply voltage source;
a PNP-type heat control transistor of HTR transistor type including an emitter coupled to the other end of the load and a collector coupled to a first end of a ground connection resistor, the ground connection resistor having a second end coupled to a ground, the heat control transistor configured to suppress a thermal runaway phenomenon of the constant current circuit;
a first transistor coupled to the other end of the load in parallel to the heat control transistor, and configured to increase operation efficiency of the heat control transistor; and
a second transistor configured to switch based on a node voltage at a node coupled to the first end of the ground connection resistor to maintain a level of a current flowing to the ground connection resistor substantially constant, the second transistor being coupled between the ground connection resistor and the first transistor.

12. The constant current circuit of claim 11, wherein the HTR transistor comprises:
a PNP-type master bipolar transistor having an emitter coupled to the other end of the load and a collector coupled to the ground connection resistor;
a PNP-type slave bipolar transistor having an emitter coupled to the emitter of the master bipolar transistor and a collector coupled to the ground connection resistor; and
a metal-insulator transition device of which resistance is changed depending on a temperature, the metal-insulator transition device being coupled between a base of the master bipolar transistor and a base of the slave bipolar transistor.

13. The constant current circuit of claim 12, wherein the first transistor is a PNP-type bipolar transistor having an emitter coupled to the other end of the load and a collector coupled to the base of the master bipolar transistor, the first transistor configured to receive a base voltage through its base.

14. The constant current circuit of claim 13, wherein the second transistor is a PNP-type bipolar transistor having an emitter coupled to the collector of the first transistor and a collector coupled to the ground, the second transistor configured to receive the node voltage through its base.

15. The constant current circuit of claim 14, wherein a resistor for current limit is additionally coupled between the base of the master bipolar transistor and the emitter of the second transistor.

16. The constant current circuit of claim 11, wherein the load is a load requiring a constant current.

17. The constant current circuit of claim 16, wherein the load is at least one of a LED, a power LED for lightning and a motor.

18. The constant current circuit of claim 11, wherein the constant current circuit is packaged in one chip package.

19. The constant current circuit of claim 12, wherein the constant current circuit except the metal-insulator transition device is packaged in one chip package and the chip package includes terminals configured to couple the metal-insulator transition device to the chip package.

20. A method of driving a constant current circuit comprising:
applying a power supply voltage source to one end of a load;
applying a load voltage in common to a collector of a heat control transistor coupled to the other end of the load and a collector of a first transistor, the first transistor coupled to the other end of the load in parallel to the heat control transistor;

applying a base voltage to a base of the first transistor to apply an emitter voltage of the first transistor to a base of the heat control transistor; and causing a portion of a base current of the heat control transistor to flow into a ground using a second transistor whenever a node voltage at a node coupled between an emitter of the heat control transistor and a first end of a ground connection resistor is greater than a predetermined voltage.

21. The method of claim 20, wherein the heat control transistor is a HTR transistor including at least two bipolar transistors and a metal-insulator transition device.

22. The method of claim 21, wherein:

one of the at least two bipolar transistors includes a master bipolar transistor having a collector coupled to the other end of the load and an emitter coupled to the first end of ground connection resistor;

another of the at least two bipolar transistors includes a slave bipolar transistor having a collector coupled to the collector of the master bipolar transistor and an emitter coupled to the first end of the ground connection resistor; and a resistance of the metal-insulator transition device is changed depending on a temperature, the metal-insulator transition device being coupled between a base of the master bipolar transistor and a base of the slave bipolar transistor.

23. The method of claim 22, wherein the first transistor is an NPN-type bipolar transistor having the collector is coupled to the other end of the load and the emitter coupled to the base of the master bipolar transistor, the first transistor configured to receive the base voltage through its base.

24. The method of claim 23, wherein the second transistor is an NPN-type bipolar transistor having a collector coupled to the emitter of the first transistor and an emitter coupled to a ground, the second transistor configured to receive the node voltage through the base.

* * * * *